United States Patent [19]
Calabrese et al.

[11] Patent Number: 5,812,411
[45] Date of Patent: Sep. 22, 1998

[54] TAPPED VARIABLE POTENTIOMETER RESISTOR WITH CURRENT SENSE AND SAFETY CIRCUIT

[76] Inventors: Joseph S. Calabrese, 1311 N. Chestnut, Arlington Heights, Ill. 60004; Bay E. Estes, III, 915 Carmel Dr., Palatine, Ill. 60067

[21] Appl. No.: 790,008

[22] Filed: Jan. 28, 1997

Related U.S. Application Data

[63] Continuation of Ser. No. 501,983, Jul. 14, 1995, abandoned.

[51] Int. Cl.⁶ .................................................. G01R 17/00
[52] U.S. Cl. ........................... 364/483; 364/482; 364/481; 364/550; 364/557; 219/489; 219/493; 219/412; 219/504
[58] Field of Search ..................................... 364/480–483, 364/557, 709.03, 142, 146, 188, 190, 550, 551.01; 341/35; 374/1; 323/255, 354; 324/714; 338/163, 9, 29, 68, 89, 131, 152, 196; 219/489, 491, 493, 413, 412, 710, 715, 718, 504, 716; 345/184, 156; 340/870.38, 584

[56] References Cited

U.S. PATENT DOCUMENTS

| | | | |
|---|---|---|---|
| 4,012,617 | 3/1977 | Burke et al. | 219/716 |
| 4,430,540 | 2/1984 | Scalf | 341/35 |
| 4,458,140 | 7/1984 | Belinkoff | 219/413 |
| 4,864,513 | 9/1989 | Levine et al. | 364/482 |
| 4,958,062 | 9/1990 | Han | 219/413 |
| 4,987,372 | 1/1991 | Ofari-Tenkorang et al. | 340/870.38 |
| 5,297,056 | 3/1994 | Lee et al. | 323/354 |
| 5,323,137 | 6/1994 | Kimura et al. | 338/196 |

*Primary Examiner*—Emanuel Todd Voeltz
*Assistant Examiner*—Hal D. Wachsman
*Attorney, Agent, or Firm*—Terrence Martin; Jules Jay Morris; David Barron

[57] ABSTRACT

An electronic selector knob circuit (10) which uses a tapped potentiometer (POT1) to provide accurate operation without requiring factory calibration. The potentiometer (POT1) is calibrated through on-board circuitry which includes a tap voltage biasing device and which monitors operation on a continual basis through both a current monitor (16) and a voltage monitor (18). A redundant disable circuit (14) provides a redundant hardware means for shutting off all oven heating elements.

11 Claims, 1 Drawing Sheet

TAPPED VARIABLE POTENTIOMETER RESISTOR WITH CURRENT SENSE AND SAFETY CIRCUIT

This application is a continuation of application Ser. No. 08/501,983, filed Jul. 14, 1995, now abandoned.

BACKGROUND AND SUMMARY OF THE INVENTION

The present invention relates generally to control knob circuitry and, more particularly, to a tapped variable potentiometer resistor circuit for a user actuable control knob having a current sensing capability and a redundancy circuit.

Control knobs, such as those used to provide temperature selection and indication in a household range oven, often employ a rotary variable resistor which produces a voltage used to selectively energize an oven's heating elements in order to produce an oven temperature which corresponds to that selected by the user via the control knob. However, the potentiometer used in these control circuit devices can be slightly inaccurate thereby requiring factory calibration on each unit using microprocessor software, on-board memory, expensive factory fixturing and an expensive calibration process.

The present invention provides a substantially improved control knob circuit which uses a tapped potentiometer to provide safe and accurate operation without requiring any factory calibration. The potentiometer is mechanically coupled to the user actuable knob and produces a voltage which varies in accordance with the position of the knob. The potentiometer tap voltage is biased enabling the knob circuit to be calibrated through on-board circuitry which monitors operation on a continual basis through interconnected current monitoring and voltage monitoring circuits. A disable circuit provides a redundant means for shutting off the oven heating elements.

These and other features and advantages of the present invention will become apparent upon review of the following specification, taken in conjunction with the accompanying drawings.

DETAILED DESCRIPTION OF THE PREFERRED EMBODIMENT

Figure 1:
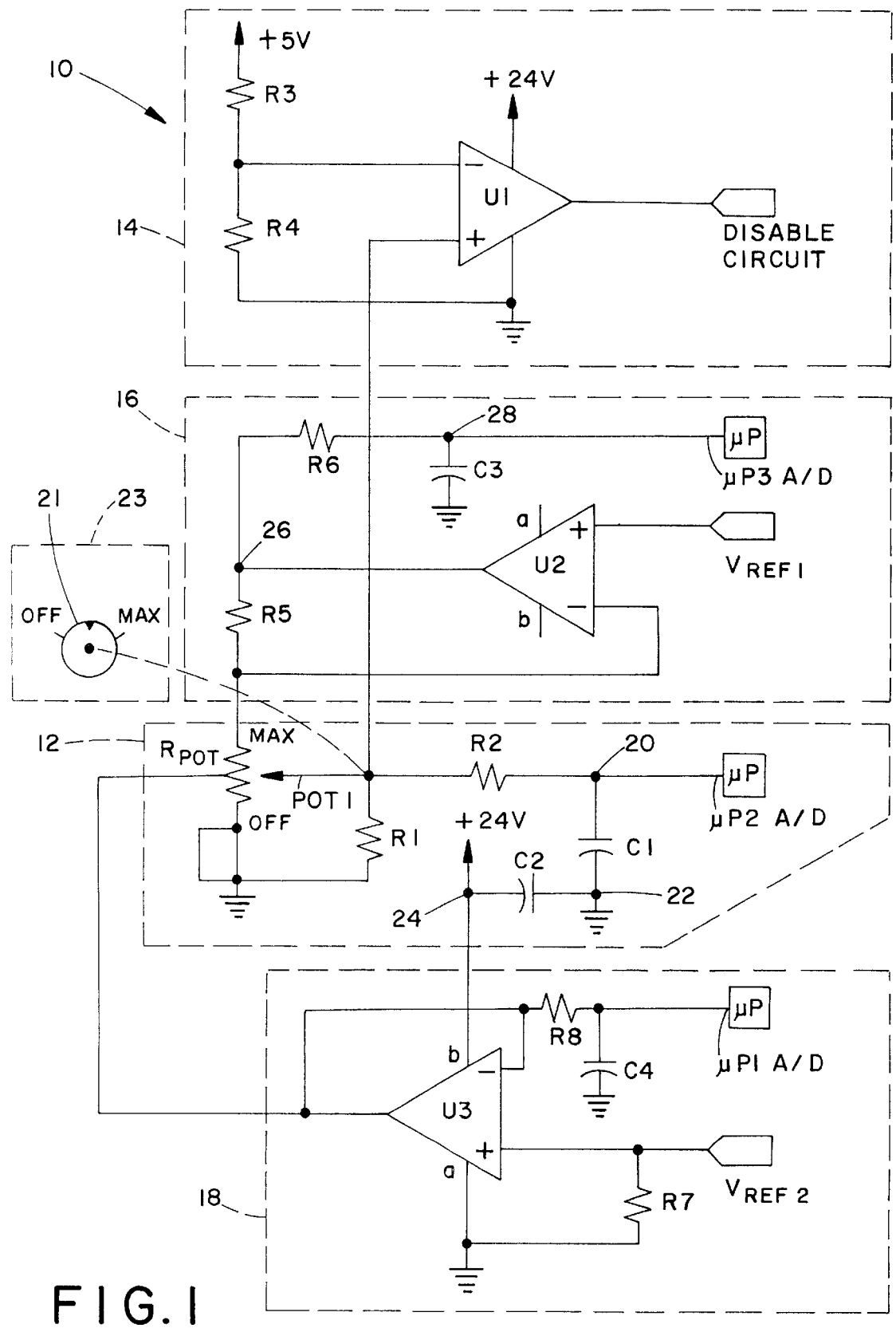
FIG. 1 is a schematic circuit diagram of the control knob circuitry of the present invention.

Turning now to the figure, the control knob circuit of the present invention is indicated generally at 10. While this control circuit is disclosed and described herein as being part of a rotary knob thermostat used in a household range oven, to be positioned to select a desired oven temperature indicated on a dial, it should become apparent that this circuit is equally well suited for use with other types of knobs as well as many other applications including control knobs for other household appliances such as a washer/dryer cycle setting knob.

Circuit 10 includes four main subcircuits, the tapped potentiometer subcircuit 12, disable subcircuit 14, a current monitor 16 and a voltage monitor 18. Subcircuit 12 includes a tapped potentiometer POT1 having a resistor $R_{POT}$ and a sweeper tied to ground through resistor R1, to pin μP2A/D of an on-board microprocessor μp through a junction 20 and a resistor R2, and to disable subcircuit 14. The microprocessor employed may be any suitable programmable logic device known to those having skill in the art and typically used in this type of application such as that sold under model number MN155402 by Matsushita Electric Industrial Company.

Junction 20 is grounded through capacitor C1 which is also coupled through capacitor C2 to a 24 volt (24 V) power source. Potentiometer POT1 is controlled by a user through a suitable knob 21, preferably rotatably mounted to a control panel 23 having corresponding desired oven temperatures contained thereon and mechanically coupled to the sweeper of POT1 in a manner known to those with skill in the art. Suitable mechanical coupling could also be provided to operate POT1 in conjunction with a sliding knob or knob of any other configuration in the same fashion.

The microprocessor, through pin μP2A/D, converts a voltage produced by POT1 into a digital value and monitors the location of the POT1 sweeper by monitoring the variable voltage produced thereby. In this exemplary embodiment the voltage provided to the microprocessor via pin μP2A/D, in conjunction with a sensor (not shown) which provides a signal indicative of the current oven temperature, is operative to control current flow to resistive oven heating elements or to an electrically actuated valve for controlling fuel flow to a gaseous burner in order to produce an oven temperature which corresponds with the position of the actuator knob as set by the user.

The POT1 sweeper is also tied to the non-inverting input of an operational amplifier (op amp) U1 of subcircuit 14. The negative input of op amp U1 is connected to a 5 volt (5 V) source through a resistor R3 and to ground through resistor R4. Op amp U1 output is tied to separate disable circuitry (not shown) provided to turn off all relay operation, the relays being operative upon receipt of an electrical control signal to energize a heating unit in the appliance. Disable subcircuit 14 thus provides a hardware driven redundant shutoff circuit for turning off the broil and/or bake elements independent of the microprocessor. In other words, when the control knob is manipulated by a user to a point corresponding to an OFF indication, in the figure positioning the POT1 sweeper at a downwardmost point toward ground, the voltage at the positive input of op amp U1 decreases to turn off the op amp and thereby cut off power to oven heating elements. Thus, the oven is turned off both through software via the microprocessor and through hardware via circuit 14.

The current through $R_{POT}$ is monitored by current monitoring subcircuit 16 to ensure POT1 does not open up. $R_{POT}$ is coupled to the negative input of op amp U2 and is powered through the output of op amp U2, through resistor R5. A reference voltage $V_{REF1}$ is fed into the non-inverting input of U2 creating the drive current for POT1. The U2 output to node 26 is also coupled through a resistor R6 and node 28, grounded through capacitor C3, to pin μP3A/D of the microprocessor. The microprocessor monitors current in order to detect a breakdown due to a broken trace or other mechanical problem.

The tap voltage of $R_{POT}$ is monitored by voltage monitor subcircuit 18 wherein a second reference voltage $V_{REF2}$ is fed to the non-inverting input of an op amp U3, as well as through a resistor R7 to ground. The output from op amp U3 is coupled to the negative input as well as through a resistor R8 to pin μP1A/D of the microprocessor to ensure that this tap voltage stays within a specified range, U3 being connected as a unity gain follower. Pin μP1A/D is also grounded through capacitor C4. U3 biases the tap voltage, thus fixing POT1 in order to compensate for inaccuracies such as nonlinearities therein, as well as maintain an accurate mechanical vs. electrical relationship.

Thus the control knob circuit 10 of the present invention provides a reliable means for selectively energizing the heating elements in a household range oven. A tap voltage bias eliminates the need for expensive factory calibration while current and voltage monitoring subcircuits ensure reliable operation. A redundant disable subcircuit provides an additional hardware means for shutting off oven heating elements in response to the user positioning the interconnected control knob to an OFF position.

For purposes of clarity the values of the components of circuit 10 have been omitted from FIG. 1, but are provided in the table below.

| Resistors | | Capacitors | | Other | |
|---|---|---|---|---|---|
| R1 | 560 kΩ | C1 | 0.1 μF | U1 | LM324 |
| R2 | 10 k | C2 | 0.1 μF | U2 | LM324 |
| R3 | 39 k | C3 | 0.1 μF | U3 | LM339 |
| R4 | 1.8 k | C4 | 0.1 μF | | |
| R5 | 866 | | | | |
| R6 | 10 k | | | | |
| R7 | 560 k | | | | |
| R8 | 10 k | | | | |
| $R_{POT}$ | 10 k | | | | |

The foregoing discussion discloses and describes an exemplary embodiment of the present invention. One skilled in the art will readily recognize that various changes and modifications can be made thereto without departing from the spirit and scope of the invention as set forth in the following claims.

What is claimed is:

1. An electronic selector circuit for producing an electrical output signal in response to the position of a user actuable control knob, said circuit comprising:

a tapped potentiometer having a sweeper mechanically coupled to said control knob and a tap from a resistor of said potentiometer, said potentiometer being operable in response to the position of said knob to produce a variable voltage and a tap voltage;

means for biasing said tap voltage of said potentiometer comprising a voltage monitoring circuit electrically coupled to said tap for monitoring said tap voltage and biasing the tap voltage with a predetermined reference voltage for ensuring the tap voltage stays in a predetermined range; and current monitoring circuit means for monitoring the current driven through the resistor of said potentiometer.

2. The circuit of claim 1 wherein said user actuable knob is rotatable and wherein said sweeper rotates with the rotation of said control knob.

3. The circuit of claim 1 wherein said potentiometer is center tapped.

4. The circuit of claim 1 wherein said biasing means includes a unity gain follower.

5. The circuit of claim 1 wherein said voltage monitoring circuit means and said current monitoring circuit means include a microprocessor electrically coupled to said potentiometer.

6. An electronic control knob circuit for setting and indicating temperature in a range oven wherein said circuit produces an electrical output signal in response to the position of a user actuable control knob, said knob being actuable to indicate a desired oven temperature, said control knob circuit comprising:

a tapped potentiometer having a sweeper mechanically coupled to said control knob and a tap from a resistor of said potentiometer, said potentiometer being operable in response to the user selected position of said knob to produce a variable voltage and a tap voltage;

means for biasing said tap voltage of said potentiometer comprising a voltage monitoring circuit for monitoring said tap voltage and biasing the tap voltage with a predetermined reference voltage for ensuring the tap voltage stays in a predetermined range; and current monitoring circuit means for monitoring the current driven through the resistor of said potentiometer.

7. The circuit of claim 6 wherein said user actuable knob is rotatable and wherein said sweeper rotates with the rotation of said knob.

8. The circuit of claim 6 wherein said potentiometer is center tapped.

9. The circuit of claim 6 wherein said biasing means includes a unity gain follower.

10. The circuit of claim 6 wherein said voltage monitoring circuit and said current monitoring circuit include a microprocessor electrically coupled to said potentiometer.

11. An electronic selector circuit for producing an electrical output signal in response to the position of a user actuable rotary knob for setting temperature in a range oven, said knob being actuable to a plurality of positions ranging from an OFF position to a maximum temperature position, said selector circuit comprising:

a tapped potentiometer having a tap from a resistor of said potentiometer and sweeper mechanically coupled to said control knob so as to produce a variable voltage in response to the position of said knob and a tap voltage in response to the position in said knob in combination with the position of said tap;

means for biasing said tap voltage, said biasing means including a unity gain follower responsive to a preselected voltage reference wherein the tap voltage is biased within a predetermined voltage range;

microprocessor means electrically coupled to said potentiometer for monitoring the current through the resistor of said potentiometer and said tap voltage; and a disable subcircuit electrically coupled to said potentiometer, said disable subcircuit operable to turn off said output device in response to said OFF position to said knob.

* * * * *